(12) United States Patent
Salgar et al.

(10) Patent No.: US 9,075,761 B1
(45) Date of Patent: Jul. 7, 2015

(54) SOCIAL SPACES FOR GAMES

(71) Applicant: Google Inc., Mountain View, CA (US)

(72) Inventors: Satyajeet Salgar, Palo Alto, CA (US);
Haruyoshi Sakai, Sunnyvale, CA (US);
Thomas B. Wilson, Mountain View, CA (US); Steven L. Martin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 13/661,221

(22) Filed: Oct. 26, 2012

(51) Int. Cl.
*G06F 15/16* (2006.01)
(52) U.S. Cl.
CPC ........................... *G06F 15/16* (2013.01)
(58) Field of Classification Search
CPC ............................. G06Q 10/10; H04L 29/06
See application file for complete search history.

(56) References Cited

U.S. PATENT DOCUMENTS

| | | | |
|---|---|---|---|
| 8,231,473 B2 | 7/2012 | Mooney et al. | |
| 8,241,116 B2 | 8/2012 | Ocko et al. | |
| 2007/0173324 A1 | 7/2007 | Multerer et al. | |
| 2012/0072497 A1 | 3/2012 | Steiert | |
| 2013/0090163 A1* | 4/2013 | Edson | 463/31 |

OTHER PUBLICATIONS

"Game World Representation of Social Network Relationship," http://ip.com/IPCOM/000203083, Jan. 18, 2011—pp. 1-4.

* cited by examiner

*Primary Examiner* — Shripal Khajuria
(74) *Attorney, Agent, or Firm* — Remarck Law Group PLC

(57) ABSTRACT

A method, computer program product, and system is described. A plurality of individuals who have participated in an electronic game are identified. A social networking group associated with participation in the electronic game is identified. The plurality of individuals is associated with the social networking group.

19 Claims, 5 Drawing Sheets

SOCIAL SPACES FOR GAMES

TECHNICAL FIELD

This disclosure relates to social spaces and players of games.

BACKGROUND

Various individuals (and groups of individuals) may participate in electronic game play. Electronic games may be available to be played through various means, including, for example, through web applications. Communication and other exchanges among various players of a particular game (or set of games) may enhance enjoyment of game play and other aspects of the experiences of the players.

BRIEF SUMMARY OF THE DISCLOSURE

According to one aspect of the disclosure, a computer-implemented method includes identifying, by one or more computing devices, a plurality of individuals who have participated in an electronic game. The method further includes identifying, by the one or more computing devices, a social networking group associated with participation in the electronic game. The method further includes associating, by the one or more computing devices, the plurality of individuals and one or more of a developer of the electronic game and an administrator associated with the electronic game with the social networking group.

According to another aspect of the disclosure, a computer-implemented method includes identifying, by one or more computing devices, a plurality of individuals who have participated in an electronic game. The method further includes identifying, by the one or more computing devices, a social networking group associated with participation in the electronic game. The method further includes associating, by the one or more computing devices, the plurality of individuals with the social networking group.

One or more of the following features may be included. The method may include associating with the social networking group one or more of a developer of the electronic game and an administrator associated with the electronic game. The plurality of individuals may include a plurality of individuals who have been confirmed as participating in the electronic game more than a threshold number of times. The plurality of individuals may include a plurality of individuals who have been confirmed as attempting one or more specific actions within the electronic game. The plurality of individuals may include a plurality of individuals who have been confirmed as completing the one or more specific actions within the electronic game. The plurality of individuals may include a plurality of individuals who have been confirmed as executing one or more specific activity types within a plurality of electronic games, wherein the plurality of electronic games includes the electronic game, and wherein the one or more specific activity types are common to each electronic game included in the plurality of electronic games. The plurality of individuals may include a plurality of individuals who have been confirmed as attaining an elite status within the electronic game. The plurality of individuals may include one or more of a set of individuals residing in a determined geographical area, a set of individuals belonging to a determined age cohort and a set of individuals currently available for synchronous communication. The plurality of individuals may include a set of individuals sharing a social affinity.

According to another aspect of the disclosure, a computer program product resides on a computer readable storage medium and has a plurality of instructions stored on it. When executed by a processor, the instructions cause the processor to perform operations including identifying a plurality of individuals who have participated in an electronic game. The operations further include identifying a social networking group associated with participation in the electronic game. The operations further include associating the plurality of individuals with the social networking group.

One or more of the following features may be included. The operations may further include associating with the social networking group one or more of a developer of the electronic game and an administrator associated with the electronic game. The plurality of individuals may include a plurality of individuals who have been confirmed as participating in the electronic game more than a threshold number of times. The plurality of individuals may include a plurality of individuals who have been confirmed as attempting one or more specific actions within the electronic game. The plurality of individuals may include a plurality of individuals who have been confirmed as completing the one or more specific actions within the electronic game. The plurality of individuals may include a plurality of individuals who have been confirmed as executing one or more specific activity types within a plurality of electronic games, wherein the plurality of electronic games includes the electronic game, and wherein the one or more specific activity types are common to each electronic game included in the plurality of electronic games. The plurality of individuals may include a plurality of individuals who have been confirmed as attaining an elite status within the electronic game. The plurality of individuals may include one or more of a set of individuals residing in a determined geographical area, a set of individuals belonging to a determined age cohort and a set of individuals currently available for synchronous communication. The plurality of individuals may include a set of individuals sharing a social affinity.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
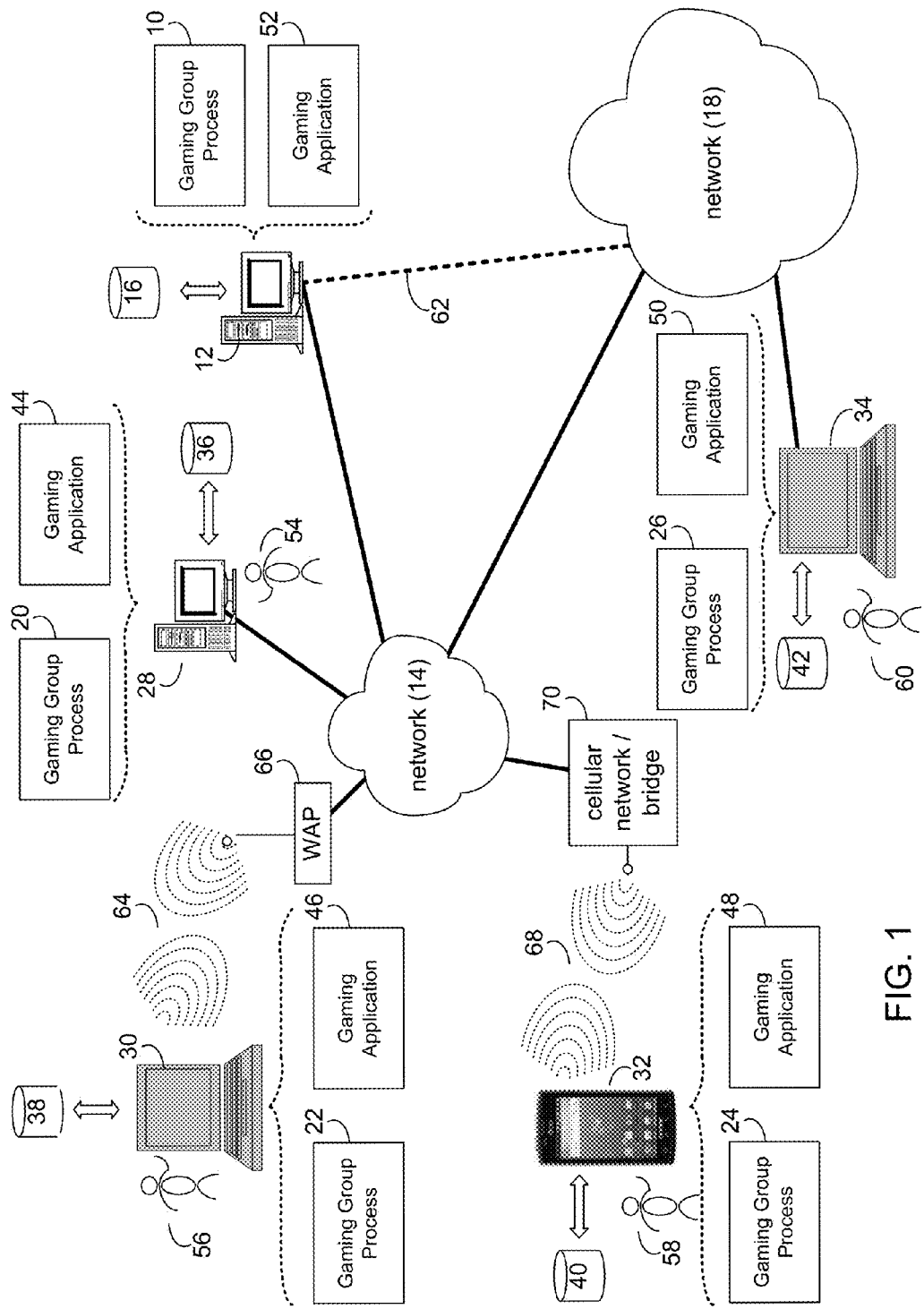
FIG. 1 is a diagrammatic view of a gaming group process coupled to a distributed computing network.

Individuals may access various electronic games for game play in a variety of ways, including, for example, through a gaming application ("GA"). A GA may, for example, be a web application or other application that facilitates one or more players engaging in a particular type of game play (e.g., as part of a particular game). A GA may include various functionality, some of which may relate to core game play and some of which may be ancillary to core game play. For example, in addition to directly facilitating game play, a GA may facilitate communication among individuals, sharing of game items or other electronic objects among individuals, and so on.

Many individuals engage (e.g., through a GA) in electronic games of various sorts, many of which may be enhanced by electronically sharing game items (or other content related to the game) or otherwise communicating with other individuals (e.g., about aspects of the game). In certain embodiments, communication among relevant individuals may be usefully enhanced through the utilization of a relevant social network (e.g., a social network organized, administered, populated, and/or directed, and so on, toward relevant aspects of one or more games or game play). It may be useful, therefore, to identify relevant social networking groups for game players (and others) based on parameters associated with the game players and/or game play.

To facilitate the objective above (and other objectives), a gaming group ("GG") process may, for example automatically identify (e.g., select and/or create) a social networking group that includes individuals associated in various ways with one or more electronic games. For example, in one embodiment, a GG process may identify a social networking group associated with all players (or a group of players, based on various criteria—e.g., geography, age, etc.) who have been confirmed as players of a particular game. GG process may then include those identified players (or a portion thereof) in such social networking group. In this way, for example, a GG process may automatically facilitate all (or a portion) of the players of a particular game (or games) sharing and/or receiving game-related content, communications, and so on with and/or from individuals and groups that may be similarly interested in that content, communications and so on. In an embodiment, developers or administrators may also be automatically included in such a group. In this way, for example, a GG process may facilitate informing developers (and/or administrators) of aspects of game players' experience with a game and/or help developers (and/or administrators) effectively disseminate game-related content, communications, and so on to a relevant audience. A GG process may identify relevant social networking groups and associate individuals with those groups based on a variety of game-related and other criteria.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, a GG process may be coupled to a computer or computer network. For example, server GG process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server GG process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademark of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client GG processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CEO, Red Hat® Linux®, or a custom operating system.

The instruction sets and subroutines of client GG processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the GG process may be a server-side process (e.g., which may be implemented via server GG process 10), in which all of the functionality of the GG process may be executed on a server computer (e.g., server computer 12). In an embodiment, the GG process may be a client-side process (e.g., which may be implemented via one or more of client GG processes 20, 22, 24, 26), in which all of the functionality of the GG process may be executed on a client computing device (e.g., one or more of client electronic devices 28, 30, 32, 34). In an embodiment, the GG process may be a hybrid server-client process (e.g., which may be implemented by server GG process 10 and one or more of client GG processes 20, 22, 24, 26), in which at least a portion of the functionality of the GG process may be implemented via server computer 12 and at least a portion of the functionality of the GG process may be implemented via one or more client computing devices (e.g., one or more of client electronic devices 28, 30, 32, 34).

A gaming application ("GA") may operate on a client device (e.g., client GA 44, operating on client electronic device 28; client GA 46, operating on client electronic device 30; client GA 48, operating on client electronic device 32; or client GA 50, operating on client electronic device 34). A client GG process (e.g., client GG process 20) or a server GG process (e.g., server GG process 10) may be in communication with a client GA (e.g., client GA 44) or may be part of a client GA. Further, in an embodiment a client GG process may include a module and/or component of a client GA. In such an embodiment at least a portion of the functionality of the GG process may be provided by the client GA.

A GA may additionally or alternatively operate on a server device (e.g., server GA 52, operating on server computer 12 or another server GA (not shown), operating on another server computer (not shown)). A server GG process (e.g., server GG process 10) or a client GG process (e.g., client GG process 20) may be in communication with a server GA (e.g., server GA 52) or may be a part of a server GA. Further, in an embodiment a server GG process may include a module and/or a component of a server GA (or vice versa). In such an embodiment at least a portion of the functionality of the GG process may be provided by the server GA (or vice versa).

In addition to functionality related to game play and so on, in certain embodiments, a GA may provide social networking application functionality. In certain embodiments, GA functionality may additionally/alternatively be included within a social networking application (not shown). Additionally/alternatively one or more of a client (and/or server) GA and/or a client (and/or server) GG process may interface and or interact with a social networking application (not shown), which may reside on and/or be executed by, at least in part, server computer 12 and/or another computing device.

Users 54, 56, 58, 60 may access a GG process in various ways. For example, these users may access server GG process 10 directly through the device on which a client process (e.g., client GG processes 20, 22, 24, 26) is executed, namely client electronic devices 28, 30, 32, 34. Users 54, 56, 58, 60 may access server GG process 10 directly through network 14 and/or through secondary network 18. Further, server computer 12 (i.e., the computer that executes server GG process 10) may be connected to network 14 through secondary network 18, as illustrated with phantom link line 62. Users 54, 56, 58, 60 may also access a client or server GA in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client GG process 20 will be described for illustrative purposes. It will be understood that client GG process 20 may, for example, interact and/or communicate with a server GG process such as server GG process 10 and/or may be executed within one or more applications that allow for communication with other server and/or client GG processes. GG process 20 may be utilized as part of or in conjunction with a variety of server and/or client GA applications, such as client GA 44 or server GA 52. In certain embodiments GG process 20 may be utilized as part of or in conjunction with a variety of other consumption applications and/or communication applications (not shown), facilitating consumption of content and/or communication among individuals and/or groups. This is not intended to be a limitation of this disclosure, as other configurations are possible. For example, some implementations may include one or more of client GG processes 22, 24, 26 or server GG process 10 in place of or in addition to client GG process 20. Additionally/alternatively, GG process 20 may include stand-alone client processes and/or stand-alone server processes, GG process may be utilized as part of or in conjunction with client GA 46, 48, 50 or another server GA or other applications (not shown), and so on.

Figure 2:
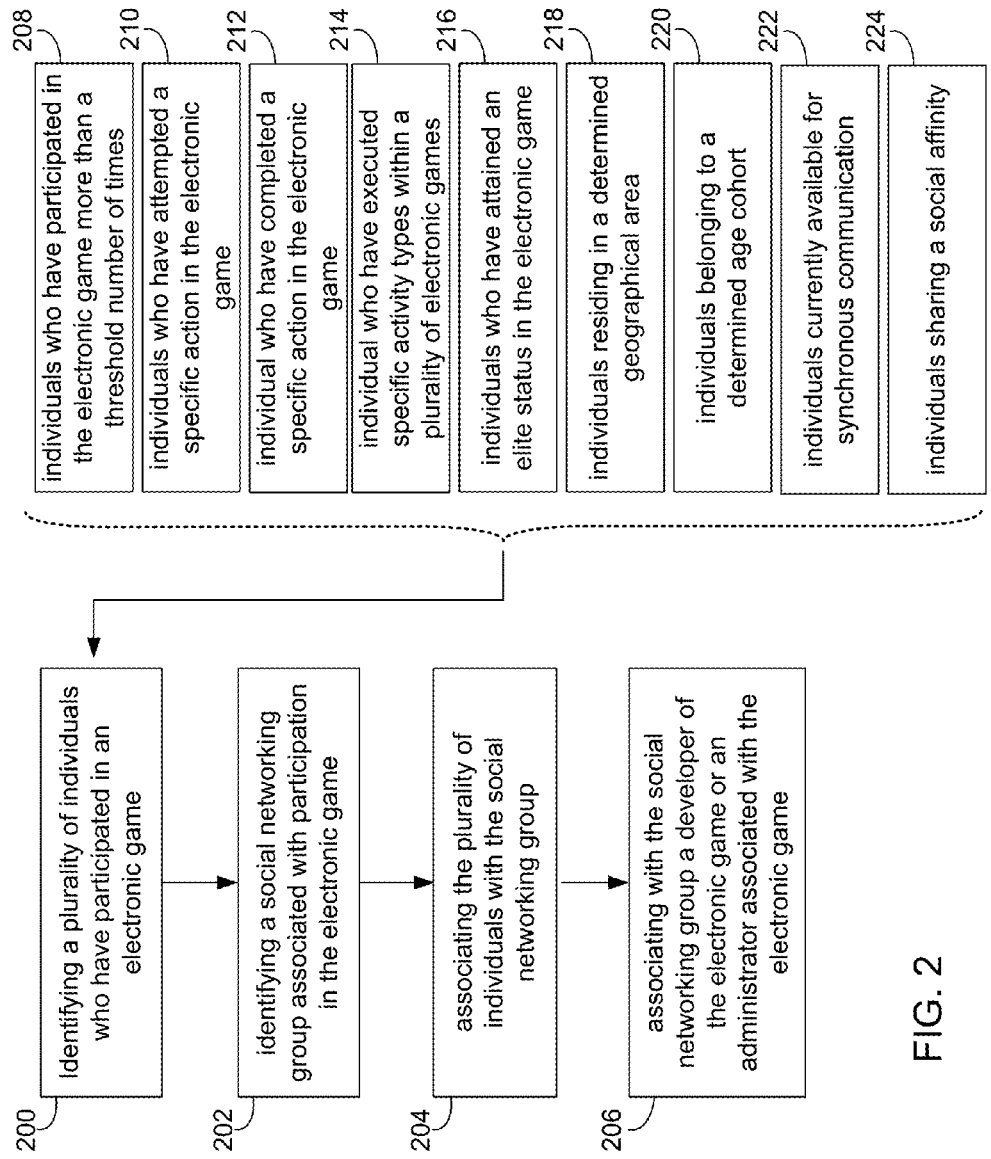
FIG. 2 is a flowchart of a process executed by the gaming group process of FIG. 1.

Referring now also to FIG. 2, there is shown a diagrammatic view of an example process that may be implemented by a GG process, e.g., client GG process 20. GG process 20 may identify 200 a plurality of individuals who have participated in an electronic game. For example, GG process 20 may mine a record of registered players of an electronic game, may utilize sign-in or other information associated with game players, and so on in order to identify 200 a relevant group of players. In certain embodiments, GG process 20 may identify 200 individuals specifically and/or personally (e.g., by name, contact information, and so on). In certain embodiments, GG process 20 may identify 200 individuals anonymously (e.g., using anonymized identifiers) or semi-anonymously (e.g., using customized/customizable member identifiers such as screen names, but not personally-identifying identifiers such as real names, addresses, and so on).

GG process 20 may identify 202 a social networking group associated with participation in the electronic game. In certain embodiments, identifying 202 a social networking group may include creating a social networking group. For example, GG process 20 may create a social networking group associated with some (or all) participants in an electronic game, some (or all) purchasers or registrants of an electronic game, and/or some (or all) participants associated with various other game-related categories.

In certain embodiments, GG process may identify 202 a pre-existing social networking group. For example, GG process may identify 202 a pre-existing social networking group that is associated with some (or all) participants in an electronic game, some (or all) purchasers or registrants of an electronic game, and/or some (or all) participants associated with various other game-related categories. In certain embodiments, an identified 202 social networking group may additionally/alternatively be associated with individuals other than participants in a particular game. For example, GG process 20 may identify 202 a social networking group associated with developers and/or administrators of a particular game.

GG process 20 may associate 204 a portion of the plurality of individuals with the social networking group. For example, having identified 200 a plurality of individuals who have participated in a particular game, GG process 20 may identify 202 a social networking group relevant to such participation, and may associate 204 the plurality of individuals (or a portion thereof) with the social networking group. In this way, for example, GG process 20 may facilitate, within a social-networking framework, game-specific (and other) communicative (and other) exchanges among the plurality of participants. For example, GG process 20 may facilitate participants in a farming game exchanging virtual farm animals (and/or communicating about such farm animals, and so on) with other participants in the farming game who may be interested in such exchanges (and/or communications and so on).

In certain embodiments, GG process 20 may associate 204 individuals with a social networking group automatically. In certain embodiments, GG process 20 may associate 204 individuals with a social networking group based on receiving a user input in response to a prompt. For example, GG process may prompt a user (and/or an administrator, and so on) for permission to associated 204 that individual with a social networking group. In certain embodiments, GG process 20 may associate 204 individuals with a social networking group based on user (or other) preferences. For example, based on user preferences GG process 20 may automatically associate 204 a particular user with identified 202 social networking groups relating a particular gaming activity (or other parameter) but may associated 204 the user with identified 202 social networking groups relating to a different gaming activity (or other parameter) only based on active approval from the user (e.g., based on an input from the user in response to a related prompt).

GG process 20 may associate 206 with the social networking group one or more of a developer of the electronic game and an administrator associated with the electronic game. For example, it may be useful to facilitate communications (and/ or other exchanges) among players of a game and developers (and/or administrators) of a game. For example, such communication (and/or other exchanges) may facilitate developers (and/or administrators) receiving and responding to participant comments and other feedback, may facilitated dissemination by the developers (and/or administrators) of information about the game (or, for example, related products) and/or digital objects associated with a game (or, for example, related products), and so on. GG process may facilitate such communications (and/or exchanges), for example, by associating 206 with the social networking group game developers and/or administrators.

The plurality of individuals may include individuals 208 who have participated in an electronic game more (or less) than a threshold number of games. For example, in certain embodiments it may be useful to identify 202 and/or populate (e.g., by associating 204 individuals) a social networking group directed toward players with a certain level of experience in a game. As such, for example, GG process 20 may identify 200 a plurality of individuals 208 who have played a particular game at least (or no more than) a particular number of times, identify 202 a social networking group associated with such a level of player experience, and associate 204 those players with that group. In certain embodiments, for example, this may facilitate appropriately targeted communication (and/or exchanges) between associated 206 developers or administrators and associated 204 individuals. For example, based on GG process 20 associating 204 with a social networking group individuals 208 who have played a game more than 1,000 times, an administrator associated 206 with the group who desires to promote the game by providing promotional objects and/or game advice, may tailor those objects and/or advice to match the experience level of the associated 204 individuals 208.

The plurality of individuals may include individuals 210 who have attempted a specific action in an electronic game. For example, a particular game may include a variety of actions, which may be different in character from each other (e.g., may require different skills, actions, or abilities) and/or may, in certain embodiments, be serialized (e.g., players may not attempt a particular action before completing an earlier action). In certain embodiments, actions occurring later in a serialized set of actions may be intended by developers to remain secret to players until the players have attempted (and/or completed) certain prerequisite actions. Similarly, in certain embodiments, it may be useful to bring together players who have attempted a particularly difficult action, but who have (for example) not yet succeeded in completing it, so that they may discuss strategies, commiserate over their lack of success, and so on. As such, for example, it may be useful to segregate communication (and/or other exchanges) between players who have attempted a certain action and communication (and/or other exchanges) between players who have not attempted the action Accordingly, for example, to facilitate appropriate discussion (and/or exchanges) among players it may be useful to identify 200 only individuals 210 who have already attempted a particular action in a game. In certain embodiments, GG process 20 may additionally/alternatively identify 202 and/or populate (i.e., associate 204 individuals with) a social networking group based on attempted actions.

The plurality of individuals may include individuals 212 who have completed a specific action in the electronic game. As noted above, a particular game may include a variety of actions, which may be different in character (e.g., may require different skills, actions, or abilities) and may, in certain embodiments, be serialized (e.g., players may not be permitted to attempt a particular action until they have completed an earlier action). In certain embodiments, actions occurring later in a serialized set of actions may be intended by developers to remain secret to players until the players have completed certain prerequisite actions. Similarly, in certain embodiments, completing an action may require particular creativity or deciphering a puzzle and, as such, for example, it may be useful to segregate communication (and/or other exchanges) between players who have completed the action and communication (and/or other exchanges) between players who have not completed the action. Accordingly, for example, to facilitate appropriate discussion (and/or exchanges) among players, it may be useful to identify 200 only individuals 212 who have completed a particular action in a game. In certain embodiments, GG process 20 may additionally/alternatively identify 202 and/or populate a social networking group based on completed actions.

The plurality of individuals may include individuals 214 who have executed a particular activity type within a plurality of games. For example, various games may include similar activity types (e.g., chance-based mini-games within a larger game, puzzle-based game modules, contests of skill within a game, contests of quickness within a game, and so on). Further, certain players of the various games may sometimes engage in an activity of a particular type in two or more of the various games. For example, a particular player may be particularly interested in chance- and quickness-based mini-games and, accordingly, may often participate in those types of mini-games across various larger games. Further, such a player may be interested in communicating (and/or otherwise interacting) with other players with, for example, similar interests and/or patterns of game play. Accordingly, it may be useful to identify 200 individuals 214 who have executed (i.e., participated in) a particular activity type across a plurality of electronic games. In certain embodiments, GG process 20 may additionally/alternatively identify 200 individuals who have focused (e.g., spent a majority of their time, a majority of game credits, and so on) on a particular type of activity within a single game. In certain embodiments, GG process 20 may additionally/alternatively identify 202 and/or populate a social networking group based on activity types within one or more games.

The plurality of individuals may include individuals 216 who have been confirmed as attaining an elite status within the electronic game. In certain embodiments, for example, the focus, sophistication, tenor, vocabulary, and so on of discussions (and/or other exchanges) among players, developers and/or administrators may vary based upon a skill or achievement level of the players involved in the discussion (and/or other exchanges). This may be particularly true with respect to players that have reached a particularly high level (e.g., an "elite" status) in a game, as compared to players that have not reached as high a level. For example, players who have played a game a certain number of hours or episodes, have completed a certain number of objectives within the game, have achieved a particular skill or sophistication level, have attained a particular game rank, and so on, may be interested in discussions (and/or other exchanges) that exhibit a higher degree of specificity, sophistication, and so on which may not be appreciated and/or desirable for players who have not played as much, achieved such skill or sophistication, attained such rank, completed such objectives, and so on. As such, it may be useful to segregate communication (and/or other exchanges) between players who have attained an elite status and communication (and/or other exchanges) between players who have not attained an elite status. In certain embodiments, GG process 20 may additionally/alternatively identify 202 and/or populate a social networking group based on attainment of an elite status. As generally described above, elite status may be associated with an individual based on, at least in part, a number of hours or episodes played, objectives completed, skill level attained, or other criteria as may be established based on various rules and/or preferences.

The plurality of individuals may additionally/alternatively include a variety of other sets of individuals, based on a variety of other criteria. In certain embodiments, for example, the plurality of individuals may include individuals 218 residing in a determined geographical area (e.g., all players of a game or games that reside in upstate New York or Santa Fe, N. Mex.), individuals 220 belonging to a particular age cohort (e.g., all players of a game or games that are 18 years of age or older), individuals 222 currently available for synchronous communication (e.g., players currently participating in a chat-enabled game or currently signed into a chat-enabled communication application (e.g., a chat-enabled GA)), and so on. In this way, for example, GG process 20 may also identify 202 and/or populate social networking groups that may be relevant to players located in a particular area, belonging to a particular age cohort, and/or available for communication with other players, and so on.

In certain embodiments, GG process may identify 200 individuals 224 sharing a particular social affinity. A social affinity may, for example, describe a particular interest, association, preference, and so on, associated with a particular individual or group. For example, GG process may identify 200 individuals 224 including players of a particular game who also share an affinity for 1950s detective noir or Chicago-style pizza. Because of this shared affinity, for example, this set of players may particularly benefit from collective association with a social networking group. For example, such a group may facilitate the individuals combining discussion of the game with discussion of pizza restaurants and/or may facilitate developers or administrators targeting promotions of games (or other products and so on) appropriately (e.g., offering pizza coupons as a part of encouraging further engagement with the game). As such, for example, it may be useful for GG process 20 to identify 202 and/or populate social networking groups relevant to individuals 224 sharing one or more social affinities.

GG process 20 may identify 200 individuals 224 sharing a particular social affinity using a variety of known techniques. For example, GG process 20 may analyze social networking profile information associated with certain individuals (e.g., which may explicitly or implicitly indicate particular interests, and so on), may analyze group membership of those individuals (e.g., which may explicitly or implicitly indicate particular interest, and so on), and so on.

It will be understood that the plurality of individuals may be identified 200 based on a combination of the criteria detailed above, as well as various other criteria. For example, the identified 200 individuals may include the intersection (or union) of a group of individuals 216 who have achieved an elite status and a group of individuals 218 residing in a particular geographical area. Similarly a relevant social networking group may be identified 202 and/or populated based on a combination of the criteria detailed above as well as various other criteria.

As noted above, GG process 20 may be implemented in a variety of ways. For example, in an embodiment, GG process 20 may be implemented using an API associated with a network-based game service. Such implementation may, for example, permit developers of games to include advanced social-networking functionality and thereby increase the appeal of their games, without having to focus on understanding the server-side aspects of the game platform code and code structure. This may be desirable to developers as it may, for example, permit them to focus their time on more familiar and rewarding aspects of game development such as the user interfaces and actual game play.

Figure 3:
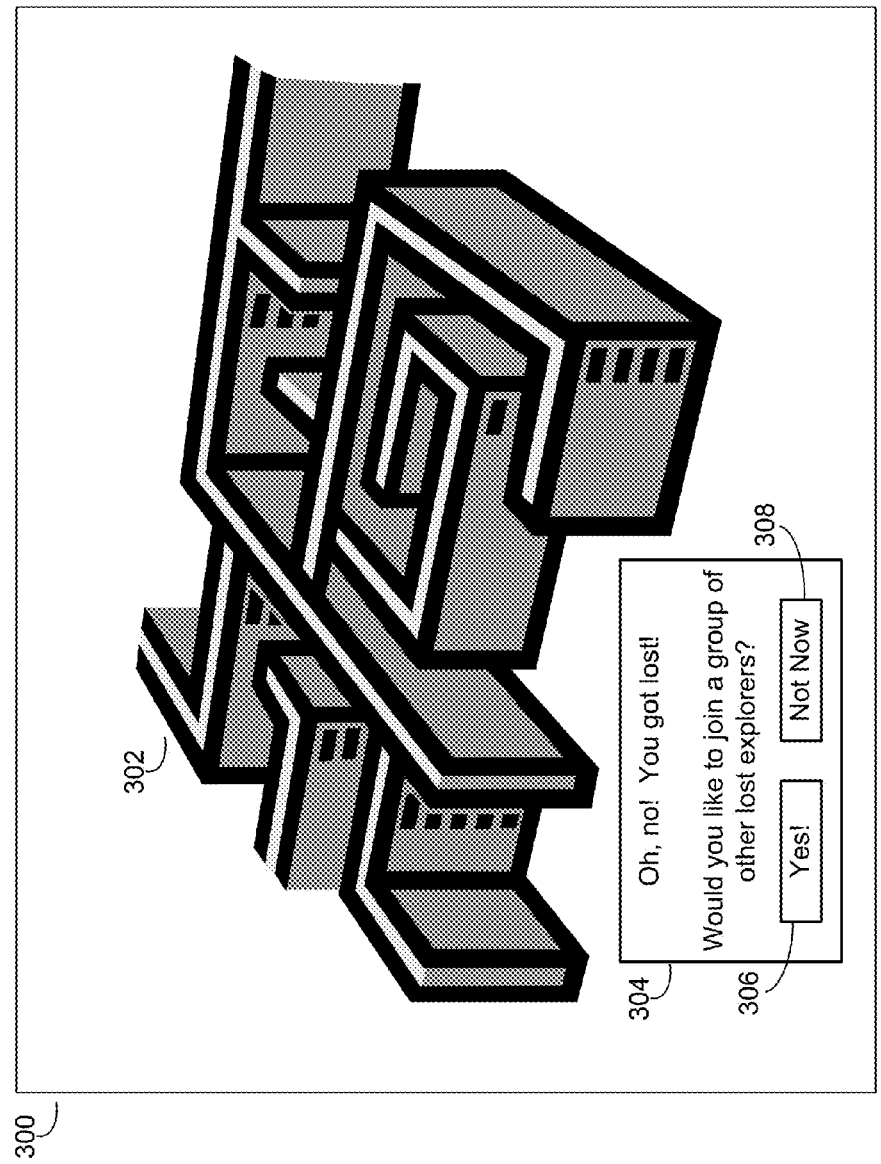
FIG. 3 is a diagrammatic view of an implementation of the gaming group process of FIG. 1.

Referring now also to FIG. 3, there is shown a diagrammatic view of an implementation of GG process 20. A game player may, for example, be engaging in a exploration-type game 300 in which one objective is to solve complicated maze 302. In certain embodiments, the player may have attempted (unsuccessfully) to solve maze 302. Based on her actions in the game (i.e., attempting to solve maze 302), such a player may be identified 200 as part of a plurality of individuals 210 who have attempted to solve maze 302 (but not, for example, as part of a plurality of individuals 212 who have completed maze 302). As such, in certain embodiments, GG process 20 may associate 204 such an individual with a social networking group associated with attempting (but not, for example, solving) maze 302. For example, GG process 20 may provide prompt 304 to the player in order to determine whether the player would like to be associated 204 with a social networking group associated with unsuccessfully attempting to solve maze 302. The player may, for example, indicate that she would like to be associated 204 with the group by selecting button 306, or may indicate that she would not like to be associated 204 with the group by selecting button 308.

Figure 4:
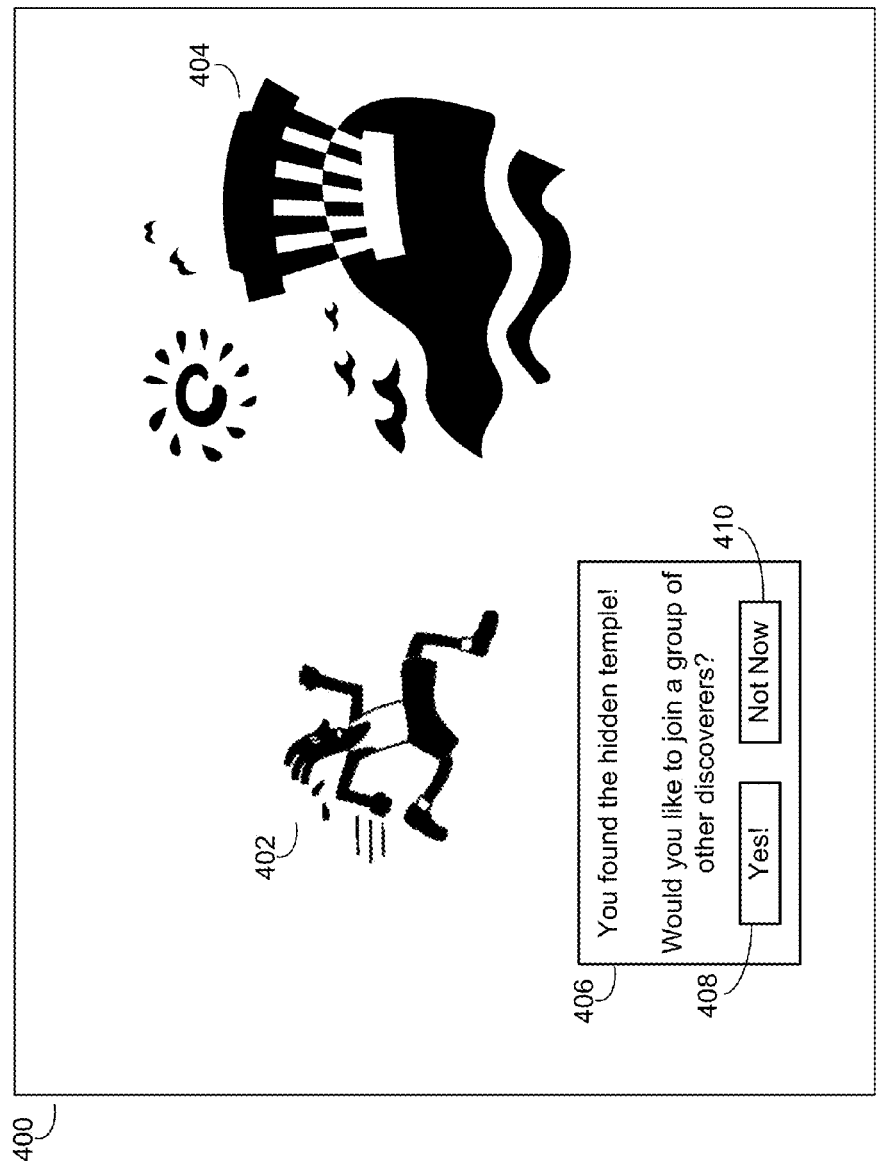
FIG. 4 is a diagrammatic view of an implementation of the gaming group process of FIG. 1.

Referring now also to FIG. 4, there is shown a diagrammatic view of an implementation of GG process 20. A game player may, for example, be engaging in a exploration-type game 400 in which one objective is to direct avatar 402 to hidden temple 404. In certain embodiments, the player may have successfully directed avatar 402 to temple 404. Based on her actions in the game (i.e., reaching temple 404), such player may be identified 200 as part of a plurality of individuals 212 who have successfully completed this specific action (as well as, for example, in certain embodiments, part of a plurality of individuals 210 who have attempted this specific action). As such, in certain embodiments, GG process 20 may associate 204 such an individual with a social networking group associated with successfully reaching hidden temple 404. For example, GG process 20 may provide prompt 406 to the player in order to determine whether the player would like to be associated 204 with a social networking group associated with reaching temple 404. The player may, for example, indicate that she would like to be associated 204 with the group by selecting button 408, or may indicate that she would not like to be associated 204 with the group by selecting button 140.

Figure 5:
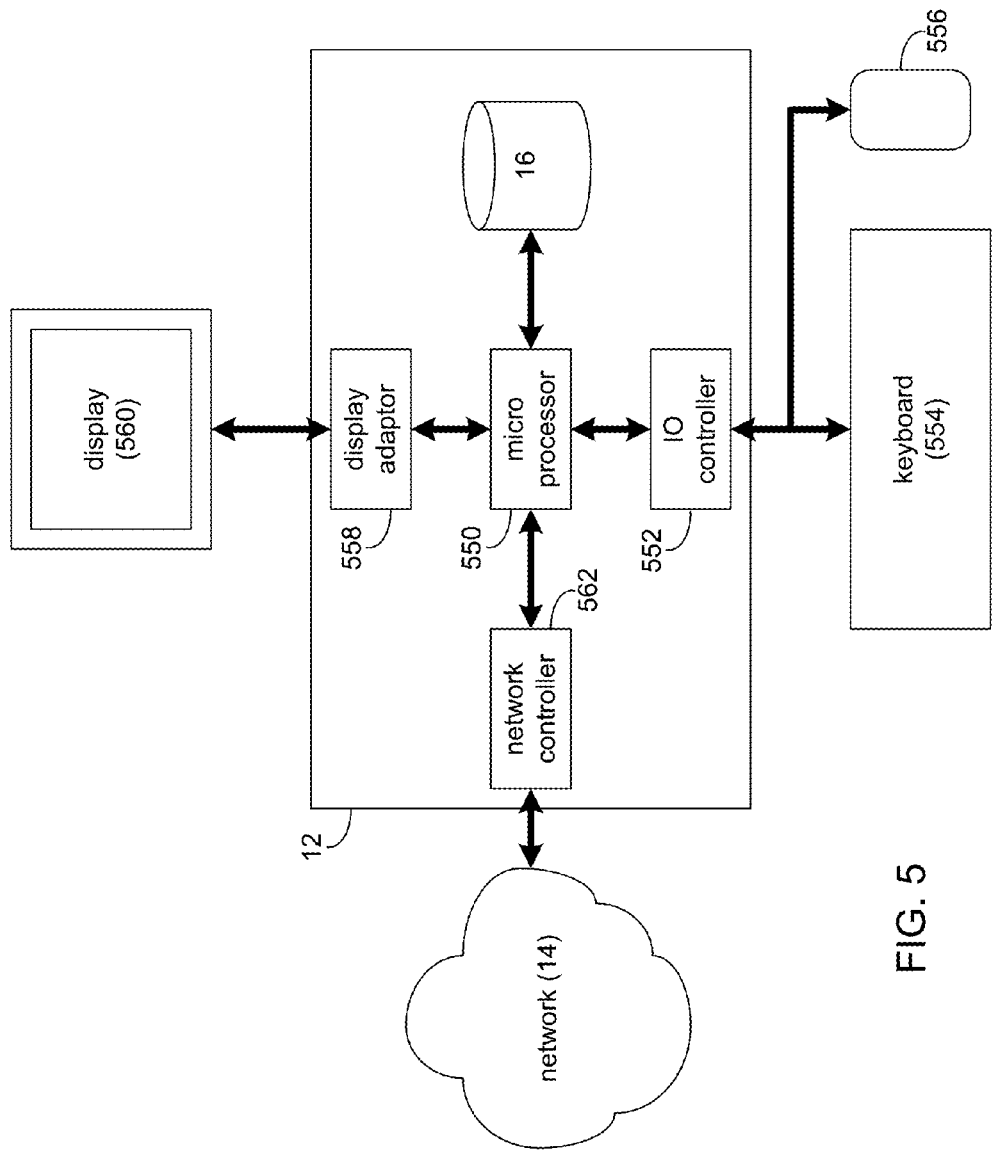
FIG. 5 is a diagrammatic view of a computing system that may execute or be utilized by the gaming group process of FIG. 1.

Referring also to FIG. 5, there is shown a diagrammatic view of an example computing system included in server computer 12. While computing system 12 is shown in this figure, this is for illustrative purposes only and is not intended to be a limitation of this disclosure, as other configuration are possible. For example, any computing device capable of executing, in whole or in part, a GG process (e.g., GG process 10, 20, 22, 24, or 26) may be substituted for the computing system 12 within FIG. 5, examples of which may include but are not limited to client electronic devices 28, 30, 32, 34.

Computing system 12 may include microprocessor 550 configured to e.g., process data and execute instructions/code for group profile process 10. Microprocessor 550 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 552 may be configured to couple microprocessor 550 with various devices, such as keyboard 554, mouse 556, USB ports (not shown), and printer ports (not shown). Display adaptor 558 may be configured to couple display 560 (e.g., a CRT or LCD monitor) with microprocessor 550, while network adapter 562 (e.g., an Ethernet adapter) may be configured to couple microprocessor 550 to network 14 (e.g., the Internet or a local area network).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

The invention claimed is:

1. A computer-implemented method comprising:
identifying, by one or more computing devices, a plurality of individuals who have participated in an electronic game;
identifying, by the one or more computing devices, a social networking group associated with participation in the electronic game; and
associating with the social networking group, by the one or more computing devices, the plurality of individuals and one or more of a developer of the electronic game and an administrator associated with the electronic game;
identifying, by the one or more computing devices, a first set of the plurality of individuals who have participated in the electronic game, wherein each individual in the first set has been confirmed as attempting but not yet completing a specific action within the electronic game;
identifying, by the one or more computing devices, a second set of the plurality of individuals who have participated in the electronic game, wherein each individual in the second set has been confirmed as successfully completing the specific action within the electronic game,
wherein the social networking group includes a first group associated with attempting but not completing the specific action, and a second group associated with completing the specific action, and
wherein associating the plurality of individuals with the social networking group comprises associating the individuals in the first set with the first group of the social networking group and the individuals in the second set with the second group of the social networking group such that communications within the social networking group are segregated between individuals that have attempted but not completed the specific action and individuals that have completed the specific action.

2. The computer-implemented method of claim 1 wherein the plurality of individuals includes only individuals currently available for synchronous communication.

3. A computer-implemented method comprising:
identifying, by one or more computing devices, a plurality of individuals who have participated in an electronic game;
identifying, by the one or more computing devices, a first set of the plurality of individuals who have participated in the electronic game, wherein each individual in the first set has been confirmed as attempting but not yet completing a specific action within the electronic game;
identifying, by the one or more computing devices, a second set of the plurality of individuals who have participated in the electronic game, wherein each individual in the second set has been confirmed as successfully completing the specific action within the electronic game;
identifying, by the one or more computing devices, a social networking group associated with participation in the electronic game, the social networking group including a first group associated with attempting but not completing the specific action, and a second group associated with completing the specific action; and
associating, by the one or more computing devices, the plurality of individuals in the first set with the first group of with the social networking group, and the individuals in the second set with the second group of the social networking group such that communications within the social networking group are segregated between individuals that have attempted but not completed the specific action and individuals that have completed the specific action.

4. The computer-implemented method of claim 3 further comprising: associating with the social networking group one or more of a developer of the electronic game and an administrator associated with the electronic game.

5. The computer-implemented method of claim 3 wherein the plurality of individuals includes a plurality of individuals who have been confirmed as participating in the electronic game more than a threshold number of times.

6. The computer-implemented method of claim 3 wherein the plurality of individuals includes a plurality of individuals who have been confirmed as executing one or more specific activity types within a plurality of electronic games, wherein the plurality of electronic games includes the electronic game, and wherein the one or more specific activity types are common to each electronic game included in the plurality of electronic games.

7. The computer-implemented method of claim 3 wherein the plurality of individuals includes a plurality of individuals who have been confirmed as attaining an elite status within the electronic game.

8. The computer-implemented method of claim 3 wherein the plurality of individuals includes one or more of a set of individuals residing in a determined geographical area and a set of individuals belonging to a determined age cohort.

9. The computer-implemented method of claim 3 wherein the plurality of individuals includes a set of individuals currently available for synchronous communication.

10. The computer-implemented method of claim 3 wherein the plurality of individuals includes a set of individuals sharing a social affinity.

11. The computer-implemented method of claim 3 wherein the plurality of individuals includes only individuals currently available for synchronous communication.

12. A computer program product residing on a non-transitory computer readable medium having a plurality of instructions stored thereon, which, when executed by a processor, cause the processor to perform operations comprising:

identifying a plurality of individuals who have participated in an electronic game;

identifying a first set of the plurality of individuals who have participated in the electronic game, wherein each individual in the first set has been confirmed as attempting but not yet completing a specific action within the electronic game;

identifying a second set of the plurality of individuals who have participated in the electronic game, wherein each individual in the second set has been confirmed as successfully completing the specific action within the electronic game;

identifying a social networking group associated with participation in the electronic game, the social networking group including a first group associated with attempting but not completing the specific action, and a second group associated with completing the specific action; and associating the plurality of individuals in the first set with the first group of with the social networking group and the individuals in the second set with the second group of the social networking group such that communications within the social networking group are segregated between individuals that have attempted but not completed the specific action and individuals that have completed the specific action.

13. The computer program product of claim 12 wherein the operations further comprise: associating with the social networking group one or more of a developer of the electronic game and an administrator associated with the electronic game.

14. The computer program product of claim 12 wherein the plurality of individuals includes a plurality of individuals who have been confirmed as participating in the electronic game more than a threshold number of times.

15. The computer program product of claim 12 wherein the plurality of individuals includes a plurality of individuals who have been confirmed as executing one or more specific activity types within a plurality of electronic games, wherein the plurality of electronic games includes the electronic game, and wherein the one or more specific activity types are common to each electronic game included in the plurality of electronic games.

16. The computer program product of claim 12 wherein the plurality of individuals includes a plurality of individuals who have been confirmed as attaining an elite status within the electronic game.

17. The computer program product of claim 12 wherein the plurality of individuals includes one or more of a set of individuals residing in a determined geographical area, a set of individuals belonging to a determined age cohort, and a set of individuals currently available for synchronous communication.

18. The computer program product of claim 12 wherein the plurality of individuals includes a set of individuals sharing a social affinity.

19. The computer program product of claim 12 wherein the plurality of individuals includes only individuals currently available for synchronous communication.

* * * * *